United States Patent
Tsuchiya et al.

(10) Patent No.: US 8,081,006 B2
(45) Date of Patent: Dec. 20, 2011

(54) NON-LINEAR SENSOR TEMPERATURE COMPENSATION USING SUMMED TEMPERATURE COMPENSATION SIGNALS

(75) Inventors: Munenori Tsuchiya, Ueda (JP); Lucas Laren Piquet, Pocatello, ID (US); Larry Petersen, Pocatello, ID (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 11/460,948

(22) Filed: Jul. 28, 2006

(65) Prior Publication Data
US 2008/0024147 A1 Jan. 31, 2008

(51) Int. Cl.
*G01R 27/08* (2006.01)
(52) U.S. Cl. ........................................ 324/721
(58) Field of Classification Search .................. 324/721; 702/104, 130
See application file for complete search history.

(56) References Cited

U.S. PATENT DOCUMENTS

| | | | | |
|---|---|---|---|---|
| 4,053,886 | A * | 10/1977 | Wright et al. | 342/192 |
| 5,241,850 | A * | 9/1993 | Kawate | 73/1.88 |
| 5,848,383 | A | 12/1998 | Yunus | 702/104 |
| 5,902,925 | A | 5/1999 | Crispie et al. | 73/1.88 |
| 6,374,191 | B1 | 4/2002 | Tsuchiya et al. | 702/104 |
| 6,389,371 | B1 | 4/2002 | Tsuchiya et al. | 702/189 |
| 7,256,378 | B2 * | 8/2007 | Furukawa et al. | 250/208.1 |
| 7,373,266 | B2 * | 5/2008 | Petersen et al. | 702/104 |
| 2005/0226316 | A1 * | 10/2005 | Higashino et al. | 375/233 |

OTHER PUBLICATIONS

Turner et al., The Illustrated Dictionary of Electronics, TAB Professional and Reference Books, TAB Books Inc., Fourth edition, 1988, p. 148.*
Heathkit Zenith, Digital Techniques, Heath Co., 13th printing, 1978, pp. 1-39.*
Green, D.C., Digital Electronics, 5$^{th}$ edition, Addison Wesley, 1999, pp. 194-197.*
Kuphaldt, Tony. Lessons in Electric Circuits, vol. III—Semiconductors, 2000-2010, Design Science Open Book, 524 pages with p. 439-459 dedicated to differentiators (derivative circuits) and integrators.*
U.S. Appl. No. 11/460,951, Sensor Calibration Using Selectively Disconnected Temperature, filed Jul. 28, 2006, Larry Petersen, et al.

* cited by examiner

*Primary Examiner* — Thomas F. Valone
(74) *Attorney, Agent, or Firm* — Workman Nydegger (57) ABSTRACT

A sensor temperature compensation circuit that includes a sensor and non-linear temperature compensation circuit that compensates for non-linear temperature dependencies in offset and/or gain generated by the sensor. For instance, to at least partially compensate for offset temperature dependencies, a summer adds two offset compensation signals, the ratio of the second to the first being a function of temperature. The summed signal may then be multiplied by a function of temperature. The summed signal may then be used to provide the non-linear temperature compensation to the offset. Alternatively or in addition, to at least partially compensate for gain temperature dependencies, a summer adds two gain compensation signals, the ratio of the second to the first being a function of temperature. The summed signal may then be multiplied by a function of temperature. The summed signal may then be used to provide non-linear temperature compensation to the gain.

11 Claims, 3 Drawing Sheets

NON-LINEAR SENSOR TEMPERATURE COMPENSATION USING SUMMED TEMPERATURE COMPENSATION SIGNALS

BACKGROUND

Electronic circuitry provides complex functionality that is proving ever more useful. One type of circuit is a sensor that senses a physical parameter to be measured (such as, for example, pressure), and generates an electrical sensor output signal that represents the measured parameter.

However, the electrical sensor output signal may vary with temperature even given a constant value of the physical parameter being measured. More specifically, temperature variations may cause the offset and gain of the electrical sensor output signal to vary thereby introducing temperature-induced inaccuracies into the sensor measurement.

Accordingly, sensor circuits often include a temperature compensation circuit within the signal path that follows the sensor. The temperature compensation circuit allows for some temperature compensation of the offset and gain of the electrical sensor output signal. Some temperature compensation circuits provide linear temperature compensation. However, the offset and gain of the electrical sensor output signal includes temperature-dependencies that are not linear. Stated another way, the electrical sensor output signal includes second and potential higher-order temperature dependencies. Accordingly, depending on the application, linear temperature compensation may not be sufficient to achieve the desired accuracy. Non-linear temperature compensation can help improve accuracy.

According to one conventional non-linear temperature compensation circuit, non-linearity is achieved by providing a piece-wise linear approximation of the actual temperature dependencies. However, a strict piece-wise linear approximation may not be desirable in some applications and/or for some sensors.

BRIEF SUMMARY OF THE INVENTION

Embodiments of the present invention relate to a sensor temperature compensation circuit that includes a sensor and a non-linear temperature compensation circuit that compensates for non-linear temperature dependencies in offset and/or gain of the electrical sensor output signal generated by the sensor. For instance, to at least partially compensate for offset temperature dependencies, a summer adds two offset temperature compensation signals, wherein the ratio of the two signals is a function of temperature. The summed signal may then be multiplied by a function of temperature. The summed signal may then be used to provide the non-linear temperature compensation to the offset. Alternatively or in addition, to at least partially compensate for gain temperature dependencies, a summer adds two gain temperature compensation signals, the ratio of which being a function of temperature. The summed signal may then be multiplied against a function of temperature and used to provide non-linear temperature compensation to the gain.

These and other features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of the embodiments of the invention will be rendered by reference to the appended drawings. It is appreciated that these drawings depict only typical embodiments of the invention and are therefore not to be considered limiting of its scope. The embodiments will be described and explained with additional specificity using the accompanying drawings in which.

DETAILED DESCRIPTION OF THE PREFERRED EMBODIMENTS

Figure 1:
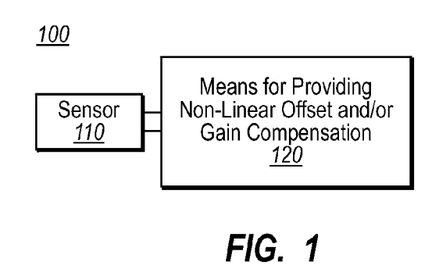
FIG. 1 illustrates a schematic of a circuit that includes a sensor and a means for providing non-linear temperature compensation.

Embodiments of the present invention relate to a sensor temperature compensation circuit that performs non-linear temperature compensation on the offset and/or gain of the electric signal generated by the sensor. FIG. 1 illustrates a sensor temperature compensation circuit 100 in accordance with the principles of the present invention.

The circuit 100 includes a sensor 110 that is structured such that when the sensor 110 is operating, the sensor 110 senses a physical parameter and generates an electrical sensor output signal that represents the physical parameter. Although the principles of the present invention are not limited to the type of physical parameter measured by the sensor 110, examples of physical parameters that could be measured by the sensor 110 include pressure, humidity, light intensity, vibrations, acceleration, temperature, magnetism, orientation, and many others.

At a given temperature, the sensor 110 generates an electrical signal with a particular offset and gain. However, as the temperature varies from the given temperature, the offset and/or gain of the output signal may also vary. These temperature dependencies in offset and gain may be somewhat compensated for by providing linear temperature compensation. However, in some higher accuracy applications, the offset or gain may be compensated for by using non-linear temperature compensation. Accordingly, the circuit 100 includes a means for providing non-linear temperature compensation 120 to the offset and/or gain of the electrical sensor 110 output signal. Examples of such a means 120 will be provided in the subsequent figures and description.

Figure 2:
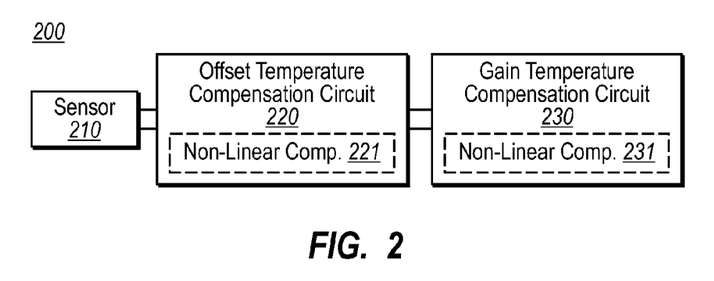
FIG. 2 illustrates a schematic of a circuit that includes an offset temperature compensation circuit and a gain temperature compensation circuit in which either or both may include non-linear temperature compensation functionality.

For instance, FIG. 2 illustrates a non-linear temperature compensation circuit 200 that includes a sensor 210, an offset temperature compensation circuit 220, and a gain temperature compensation circuit 230. One or potentially both of the offset temperature compensation circuit 220 and the gain temperature compensation circuit 230 have associated non-linear temperature compensation circuitry 221 and 231.

If equipped with non-linear temperature compensation circuit 221, the offset temperature compensation circuit 220 may perform non-linear offset temperature compensation in accordance with the principles of the present invention using summed offset compensation signals, the ratio of the signals being a function of temperature, and the summed offset compensation signal being multiplied by a function of temperature. If not equipped with non-linear temperature compensation circuit 221, the offset temperature compensation circuit 220 may perform linear offset temperature compensation or perhaps some other type of non-linear offset temperature compensation.

Similarly, if equipped with non-linear temperature compensation circuit 231, the gain temperature compensation circuit 230 may perform non-linear gain temperature compensation in accordance with the principles of the present invention using summed gain compensation signals, the ratio of the signals being a function of temperature, and the summed offset compensation signal being multiplied by a function of temperature. If not equipped with non-linear temperature compensation circuit 231, the gain temperature compensation circuit 230 may perform linear gain temperature compensation or perhaps some other type of non-linear gain temperature compensation.

Comparing FIG. 2 to FIG. 1, the sensor 210 may be structured as described above for the sensor 110. Furthermore, the combination of the offset temperature compensation circuit 220 and the gain temperature compensation circuit 230 may be viewed as a specific example of the means for providing non-linear offset and/or gain compensation 120. For some designs consistent with the principles of the present invention, the positions of the offset temperature compensation circuit 220 and the gain temperature compensation circuit 230 may be reversed.

In some conditions and/or for some sensors, there may be no need to compensate for offset or to compensate for offset temperature dependencies. In those situations, the sensor 210 of FIG. 2 may be immediately followed by the gain temperature compensation circuit 230. In that case, the gain temperature compensation circuit 230 alone (along with the non-linear temperature compensation circuit 231) may be viewed as an example of the means for providing non-linear offset and/or gain compensation 120.

Accordingly, the gain temperature compensation circuit 230 is at least indirectly coupled to the sensor circuit so as to receive a signal that is at least a function of the electrical sensor output signal. For instance, if the offset temperature compensation circuit 220 is absent, or the position of the offset and gain temperature compensation circuits 220 and 230 is reversed, the gain temperature compensation circuit 230 may be coupled directly to the sensor 210 to receive the electric sensor output signal in its true form from the sensor 210. On the other hand, as illustrated in FIG. 2, the gain temperature compensation circuit 230 may be indirectly coupled to the sensor 210 through the offset temperature compensation circuit 220 to thereby receive a signal that is only a function of the electric sensor output signal after the signal has been processed by the offset temperature compensation circuit 220. Additionally, other pre-processing components may intervene in the signal path between the sensor 210 and the gain temperature compensation circuit 230 without varying from the principles of the present invention.

Additionally, in some conditions and/or for some sensors, there may be no need to compensate for gain or to compensate for gain temperature dependencies. In those situations, the gain temperature compensation circuit 230 may be absent. In that case, the offset temperature compensation circuit 220 alone (along with the non-linear temperature compensation circuit 221) may be viewed as an example of the means for providing non-linear offset and/or gain compensation 120.

Accordingly, the offset temperature compensation circuit 220 is at least indirectly coupled to the sensor circuit so as to receive a signal that is at least a function of the electrical sensor output signal. For instance, as illustrated in FIG. 2, the offset temperature compensation circuit 220 is directly coupled to the sensor 210 to receive the sensor output signal in its original form from the sensor 210. On the other hand, if the position of the offset and gain temperature compensation circuits 220 and 230 is reversed, the offset temperature compensation circuit 220 would receive the electrical sensor output signal indirectly via the gain temperature compensation circuit 230. Additionally, other pre-processing components may intervene in the signal path between the sensor 210 and the offset temperature compensation circuit 220 without varying from the principles of the present invention.

Figure 3A:
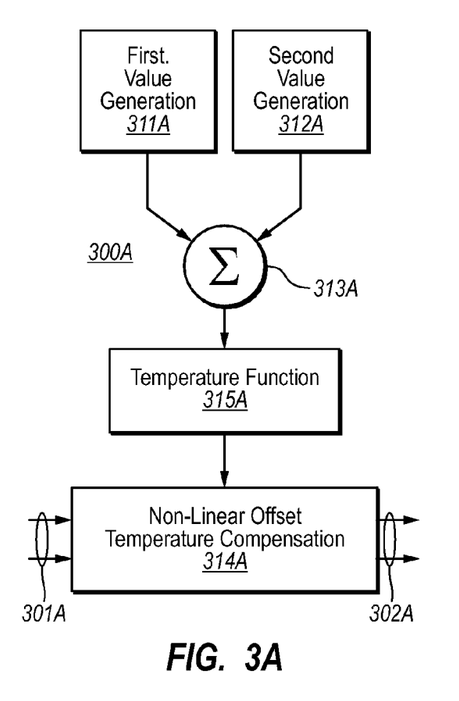
FIG. 3A illustrates a schematic of an offset temperature compensation circuit if incorporating non-linear temperature compensation in accordance with the principles of the present invention.
Figure 3B:
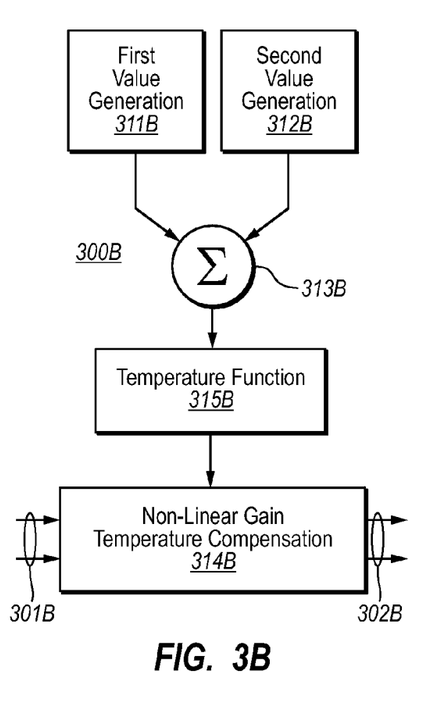
FIG. 3B illustrates a schematic of a gain temperature compensation circuit incorporated non-linear temperature compensation in accordance with the principles of the present invention.

If present, the non-linear temperature compensation circuits 221 and 231 each perform non-linear temperature compensation using a summed compensation signals, the ratio of which being a function of temperature, and by multiplying the summed compensation signal by a function of temperature. For instance, FIG. 3A illustrates an example schematic diagram of the non-linear offset temperature compensation circuit 221 in the form of circuit 300A for compensating of temperature dependencies in offset. FIG. 3B illustrates an example schematic diagram of the non-linear gain temperature compensation circuit 231 in the form of circuit 300B for compensation of temperature dependencies in gain.

FIG. 3A illustrates a non-linear offset temperature compensation circuit 300A that includes a first offset compensation value generation component 311A that is configured to generate a signal (also referred to herein as a "first offset compensation signal"). In one embodiment, this first offset compensation signal is less dependent on temperature, or perhaps completely independent of temperature. For instance, the first offset compensation signal may be proportional to an offset temperature coefficient (hereinafter "OTC") that aims to compensate for a linear portion of the offset. The non-linear offset temperature compensation circuit 300A also includes a second offset compensation value generation component 312A configured to generate a signal (also referred to herein as a "second offset compensation signal"). The ratio of the magnitude of the second offset compensation signal to the magnitude of the first offset compensation signal is a function of temperature.

The first and second offset compensation signals are provided to a summer 313A that generates a signal that is proportional to the sum of the first and second offset compensation signals. The summed offset compensation signal provided by summer 313A is then multiplied by a temperature function using a temperature function multiplication component 315A. The temperature function of the temperature function multiplication component 315A may be different than or the same as the temperature function that represents the ratio of the offset compensation signal magnitudes. In one useful embodiment described in further detail in the examples of FIGS. 4B and 4C, the temperature function of the temperature function multiplication component 315A is simply the measured temperature itself Thus, the temperature function multiplication component 315A may simply multiply the summed offset compensation signal (from the summer 313A) by the measured temperature.

A non-linear offset compensation component 314A is coupled to the temperature function multiplication component 315A so as to use the resultant signal from the temperature function multiplication component 315A (also referred to herein as an "temperature function multiplied offset compensation signal") to provide non-linear offset compensation to the electrical sensor output signal (or a processed representation thereof).

Alternatively or in addition, the gain temperature compensation circuit 230 is provided with a non-linear gain temperature compensation circuit 231 such as the non-linear gain temperature compensation circuit 300B illustrated in FIG. 3B. The non-linear gain temperature compensation circuit 300B also includes a first gain compensation value generation component 311B that is configured to generate a signal (also referred to herein as a "first gain compensation signal").

The non-linear gain temperature compensation circuit 300B also includes a second gain compensation value generation component 312B configured to generate a signal (also referred to herein as a "second gain compensation signal"). The ratio of the magnitude of the second gain compensation signal to the magnitude of the first gain temperature compensation is a function of temperature. If both the non-linear offset components circuit 300A and the non-linear gain compensation circuit 300B are present, the first offset compensation signal may be controlled separately from the first gain compensation signal. Similarly, the second offset compensation signal may be controlled separately from the second gain compensation signal.

The first and second gain compensation signals are provided to a summer 313B that generates a signal that is proportional to the sum of the first and second gain compensation signals. The summed gain compensation signal provided by summer 313B is then multiplied by a temperature function using a temperature function multiplication component 315B. The temperature function of the temperature function multiplication component 315B may be different than or the same as the temperature function that represents the ratio of the gain compensation signal magnitudes. In one useful embodiment described in further detail in the examples of FIGS. 4A and 4C, the temperature function of the temperature function multiplication component 315B is simply the measured temperature itself Thus, the temperature function multiplication component 315B may simply multiply the summed gain compensation signal (from the summer 313B) by the measured temperature.

A non-linear gain compensation component 314B is coupled to the temperature function multiplication component 315B so as to use the resultant signal from the temperature function multiplication component 315B (also referred to herein as an "temperature function multiplied gain compensation signal") to provide non-linear gain compensation to electrical sensor output signal (or a processed representation thereof).

As mentioned above, if the non-linear offset temperature compensation circuit 300A is present, the first and second offset compensation signals may be configured such that their ratio is some function of temperature. For instance, the first offset compensation signal may provide for a linear portion of offset temperature compensation, while the second offset compensation signal may provide for a non-linear portion of offset temperature compensation.

The first and second offset compensation signals may be set by alternative configuration means. For instance, the first offset compensation signal may have been obtained by multiplying some source signal by a multiplier that is equivalent to an offset temperature coefficient (OTC) that aims to compensate for a linear portion of the temperature dependency in the offset. In contrast and as an example, the second offset compensation signal may have been obtained by multiplying the same source signal by another signal that is a function of temperature. The first and second offset compensation signals may be altered as desired, and the second offset compensation signal may even be zeroed or made constant to change to linear offset temperature compensation. The second offset compensation value generation component 312A may be provided with multiple parameters to fine-tune the temperature function represented by the second offset temperature compensation signal. Thus, the non-linear offset compensation circuit 300A provides a highly flexibly means for providing temperature compensation to the offset.

The same may be said for the non-linear gain compensation circuit 300B if present. The first and second gain compensation signals may be configured such that their ratio is some function of temperature. For instance, the first gain compensation signal may provide for a linear portion of gain temperature compensation, whereas the second gain compensation signal may provide for a non-linear portion of the gain temperature compensation.

The first and second gain compensation signals may be set by alternative configuration means. For instance, the first gain compensation signal may have been obtained by multiplying some source signal by a multiplier that is equivalent to a gain temperature coefficient (GTC) that aims to compensate for a linear portion of the temperature dependency in the gain. In contrast and as an example, the second gain compensation signal may have been obtained by multiplying the same source signal by another signal that is a function of temperature. The first and second gain compensation signal may be altered as desired, and the second gain compensation signal may even be zeroed or made constant to change to linear offset temperature compensation. The second gain compensation value generation component 312B may be provided with multiple parameters to fine-tune the temperature function represented by the second gain compensation signal. Thus, the non-linear gain compensation circuit 300B provides a highly flexibly means for providing temperature compensation to the gain.

As will be described further below, the proper selection of a temperature function will provide for suitable non-linear temperature compensation of the offset and/or gain. During the calibration process, various possibilities for the temperature function may be empirically tested to obtain a suitable temperature function. Such calibration processes may take into consideration known characteristics of the general form of the temperature dependencies as will be apparent to those of ordinary skill in the art after having read this description.

Figure 4A:
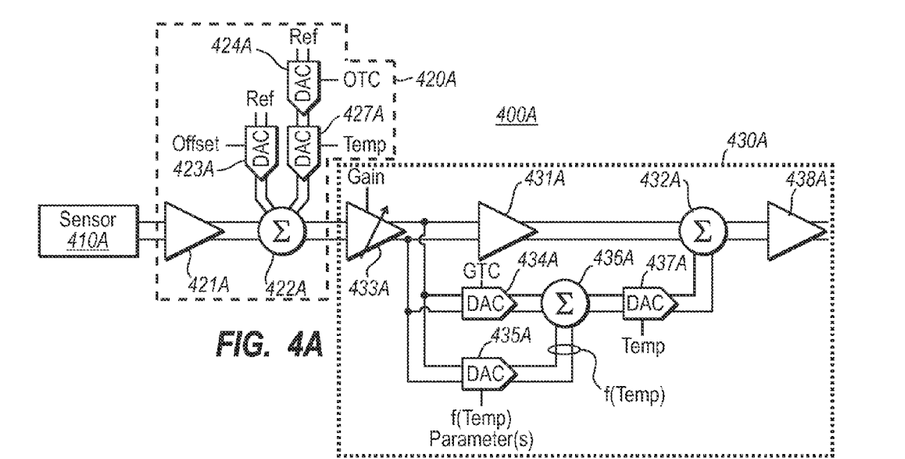
FIG. 4A illustrates a circuit diagram of a sensor with a temperature compensation circuit in which the gain temperature compensation circuit includes non-linear temperature compensation.
Figure 4B:
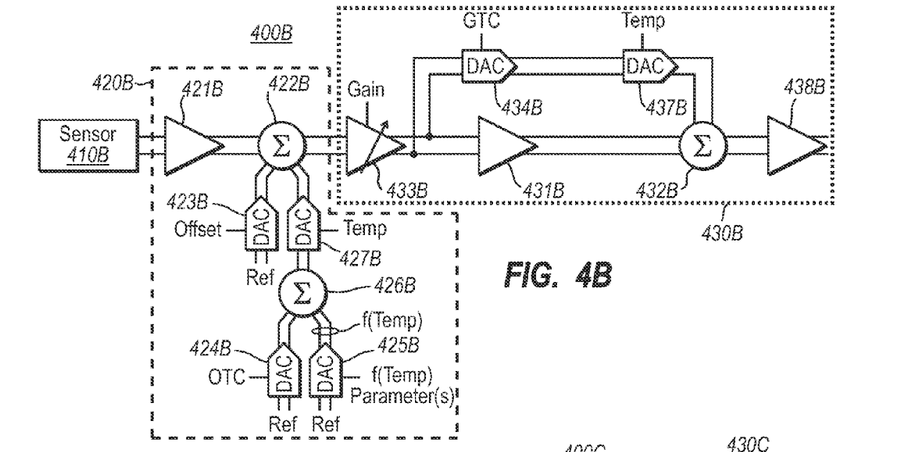
FIG. 4B illustrates a circuit diagram of a sensor with a temperature compensation circuit in which the offset temperature compensation circuit includes non-linear temperature compensation.
Figure 4C:
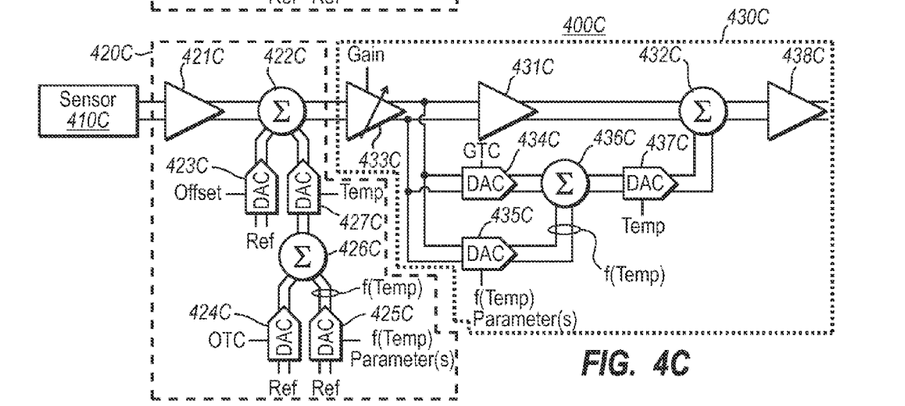
FIG. 4C illustrates a circuit diagram of a sensor with a temperature compensation circuit in which both the offset and gain temperature compensation circuits include non-linear temperature compensation.

Having now described some of the general features of the present invention, and some embodiments of the present invention, specific circuit diagrams of particular examples of such general embodiments will now be described with respect to FIGS. 4A through 4C. FIGS. 4A represents a specific circuit example in which the offset temperature compensation is linear, but the gain temperature compensation is non-linear. For contrast, FIG. 4B represents a specific circuit example in which the gain temperature compensation is linear, but the offset temperature compensation is non-linear. Finally, FIG. 4C represents a specific circuit example in which both the offset and gain temperature compensation is non-linear. In each of these examples, the first offset and gain compensation signals are each obtained by multiplying a source signal by an appropriate temperature compensation constant, whereas the second offset and gain compensation signals are obtained by multiplying a source signal by some function of temperature. FIGS. 4A through 4C will now be explained in order.

FIG. 4A illustrates a sensor temperature compensation circuit 400A that performs linear offset temperature compensation, and non-linear gain temperature compensation. The offset temperature compensation circuit 420A includes elements 421A through 424A and 427A. The gain temperature compensation circuit 430A includes elements 431A through 438A. In the particular embodiments of FIGS. 4A through 4C, the offset temperature compensation circuit performs temperature compensation on the offset of the electrical sensor output signal prior to the gain temperature compensation circuit performing temperature compensation on the gain of the electrical sensor output signal. However, the principles of the present invention are not limited to these specific circuits nor limited to the specific order of offset and gain compensation.

In the offset temperature compensation circuit 420A of FIG. 4A, the amplifier 421A amplifies the electrical sensor output signal. In this description, the term "Vin" will be used to symbolize the signal produced by the sensor (such as sensors 410A, 410B and 410C). If the amplifier 421A has a gain of one, the output signal from the amplifier 421A may also be represented using the symbol Vin.

The Offset Digital to Analog Converter (DAC) 423A generates a signal that is proportional to the two voltages called herein Offset and Ref. In one embodiment, the voltage Ref is tied to the bridge excitation voltage if the sensor 410A is a bridge sensor. This resulting signal will be referred to herein by the terminology "Offset".

The OTC DAC 424A generates a signal that is proportional to the two voltages called herein OTC (for Offset Temperature Coefficient) and Ref The resulting signal will also be referred to herein as "OTC".

The signal OTC from the OTC DAC 424A will be received by temperature DAC 427A, which is also provided with a digital signal called "Temp" that generally varies with measured temperature. The temperature DAC 427A will generate a signal representing OTC times Temp (i.e., OTC*Temp).

A summer 422A sums the three signals Vin, Offset, and OTC * Temp to obtain a signal represented by the following Formula 1A:

(Vin+Offset+OTC*Temp)  (1A)

Thus, with an appropriate selection of the values Offset and OTC, the signal generated by the summer 422A represents a function of the electrical sensor output signal Vin, but with its offset and a linear portion of the temperature dependencies in its offset being compensated for.

The electrical sensor output signal from the offset temperature compensation circuit 420A (as represented by Equation Formula 1A) is then provided to the gain temperature compensation circuit 430A. Specifically, the electrical sensor output signal is first provided to a variable gain amplifier 433A, which amplifies the signal with a gain referred to herein as "Gain". The amplified signal coming from the variable gain amplifier 433A will thus have a value defined by the following Formula 2A:

(Vin+Offset+OTC*Temp)*Gain  (2A)

This signal will also be referred to herein as the "variable gain amplifier output signal of FIG. 4A".

The variable gain amplifier output signal of FIG. 4A is provided to an amplifier 431A having a gain referred to herein as "$K_G$". Accordingly, the amplifier 431A generates an output signal represented by the following Formula 3A:

(Vin+Offset+OTC* Temp)*Gain*$K_G$  (3A)

The variable gain amplifier output signal of FIG. 4A is also provided to a GTC DAC 434A, which multiples the variable gain amplifier output signal of FIG. 4A with a Gain Temperature Coefficient (GTC) to obtain a signal represented by the following Formula 4A:

(Vin+Offset+OTC*Temp)*Gain*GTC  (4A)

This signal is an example of a first gain compensation signal of FIG. 4A. In this example, the signal of Formula 4A was obtained by applying a multiplier of GTC to a source signal represented by Formula 2A.

Finally, the variable gain amplifier output signal of FIG. 4A is provided to a Temp function DAC 435A, which multiples the variable gain amplifier output signal of FIG. 4A with a gain that is a function of temperature (referred to herein as "f(Temp)"). The resulting signal from the Temp function DAC 435A is represented by the following Formula 5A:

(Vin+Offset+OTC*Temp)*(Gain*f(Temp))  (5A)

This signal is an example of a second gain compensation signal of FIG. 4A. In this example, the signal is obtained by multiplying the sources signal of Formula 2A with a function of Temp "f(Temp)". While the function f(Temp) might be any function of temperature, the function may be carefully selected using f(Temp) parameter(s) that provide for suitable non-linear temperature compensation. Appropriate examples will be provided below with respect to FIGS. 5A and 5B, although the specific selection of the temperature function f(Temp) will be highly dependent upon the specific non-linearities present in the temperature dependencies of the gain of the electrical sensor output signal. Note that the ratio of the second gain compensation signal to the first gain compensation signal (i.e., f(Temp)/GTC, which is obtained by dividing Formula 5A by Formula 4A) is a function of temperature.

The signals from Formulae 4A and 5A are then received by summer 436A to generate a summed signal represented by the following Formula 6A:

(Vin+Offset+OTC*Temp)*(Gain*[GTC+f(Temp)])  (6A)

This signal is provided to a temperature DAC 437A where they are multiplied by the measured temperature Temp to obtain the following Formula 7A:

(Vin+Offset+OTC*Temp)*(Gain*[{GTC+f(Temp)}*Temp])  (7A)

The temperature DAC 437A represents a suitable example of the temperature function multiplication component 315B of FIG. 3B.

The summer 432A then adds the signal from Formulae 3A and 7A to obtain the following Formula 8A:

$$(Vin+Offset+OTC*Temp)*(Gain*[K_G+\{GTC+f(Temp)\}*Temp]) \quad (8A)$$

The resulting signal is then amplified by amplifier 438A. In one embodiment, the gain of amplifier 438A is one, and thus the output signal from the gain temperature compensation circuit remains the same as for Formula 8A.

Examining the resulting signal formula of Formula 8A, the offset of the electric sensor output signal is compensated for linearly since OTC is a constant value. However, since GTC+f(Temp) varies with temperature, the gain of the electrical sensor output signal is compensated for non-linearly.

FIG. 4B illustrates a sensor temperature compensation circuit 400B that performs non-linear offset temperature compensation, and linear gain temperature compensation. The offset temperature compensation circuit 420B includes elements 421B through 427B. The gain temperature compensation circuit 430B includes elements 431B through 434B, 437B and 438B.

In the offset temperature compensation circuit 420B of FIG. 4B, the amplifier 421B amplifies the electrical sensor output signal Vin. If the amplifier 421B has a gain of one, the output signal from the amplifier 421B may also be represented using the symbol Vin.

This summed signal is then provided to temperature DAC 427B, where the summed The Offset DAC 423B generates a signal that is proportional to the two voltage Offset and Ref to generate a resulting signal Offset.

The OTC DAC 424B generates a signal that is proportional to the two voltages called herein OTC (for Offset Temperature Coefficient) and Ref to generate a signal OTC. This OTC signal represents an example of the first offset compensation signal of FIG. 3A, and was obtained by applying a multiplier (also called OTC) to a source signal called Ref.

The Temp function DAC 425B generates a signal that is proportional to the voltage Ref and a function of temperature f(Temp) to generate a signal also called herein f(Temp), which signal is an example of the second offset compensation signal of FIG. 3A. Note that the ratio of the second offset compensation signal to the first offset compensation signal (i.e., f(Temp)/OTC) is a function of temperature. The temperature function f(Temp) of FIG. 4B may be different than the temperature function f(Temp) referred to for FIG. 4A since the offset and gain of a sensor often have different non-linear temperature characteristics.

The signals from the OTC DAC 424B (i.e., signal OTC) is then summed with the signal from the Temp function DAC 425B using summer 426B to generate a summed signal.

This summed signal is then provided to temperature DAC 427B, where the summed signal is multiplied by the measured temperature Temp to obtain a signal represented by the following Formula 1B:

$$(OTC+f(Temp))*Temp \quad (1B)$$

The temperature DAC 427B represents a suitable example of the temperature function multiplication component 315A of FIG. 3A.

The signal from the amplifier 421B (i.e., signal Vin), the signal from the Offset DAC 423B (i.e., signal Offset) and the signal from the temperature DAC 427B (i.e., the signal represented by Formula 1B) are then provided to summer 422B, to obtain a summed signal represented by the following Formula 2B:

$$Vin+Offset+(OTC+f(Temp))*Temp \quad (2B)$$

This summed signal represents the output from a non-linear offset temperature compensation circuit 420B.

From observation of Formula 2B, it can be seen that the temperature compensation for offset may be performed non-linearly by choosing an appropriate value for OTC and an appropriate temperature function f(Temp). The function f(Temp) may be selected using temperature function parameters provided to the Temp function DAC 425B.

The electrical sensor output signal from the offset temperature compensation circuit 420B of FIG. 4B is then provided to the gain temperature compensation circuit 430B of FIG. 4B. Specifically, the electrical sensor output signal is first provided to a variable gain amplifier 433B, which amplifies the signal with a gain Gain. The amplified signal coming from the variable gain amplifier 433B will thus have a value defined by the following Formula 3B:

$$(Vin+Offset+[OTC+f(Temp)]*Temp)*Gain \quad (3B)$$

This signal will also be referred to herein as the "variable gain amplifier output signal of FIG. 4B".

The variable gain amplifier output signal of FIG. 4B is provided to an amplifier 431B having a gain referred to herein as "$K_G$". Accordingly, the amplifier 431B generates an output signal represented by the following Formula 4B:

$$(Vin+Offset+[OTC+f(Temp)]*Temp)*(Gain*K_G) \quad (4B)$$

The variable gain amplifier output signal of FIG. 4B is also provided to a GTC DAC 434B, which multiples the variable gain amplifier output signal of FIG. 4B with a gain of a Gain Temperature Coefficient (GTC) to obtain a signal represented by the following Formula 5B:

$$(Vin+Offset+[OTC+f(Temp)]*Temp)*(Gain*GTC) \quad (5B)$$

This signal of Formula 5B is provided to a temperature DAC 437B where it is multiplied by the measured temperature Temp to obtain the following Formula 6B:

$$(Vin+Offset+[OTC+f(Temp)]*Temp)*(Gain*[GTC*Temp]) \quad (6B)$$

The summer 432B then adds the signal from Formulae 4B and 6B to obtain the following Formula 7B:

$$(Vin+Offset+[OTC+f(Temp)]*Temp)*(Gain*[K_G+\{GTC*Temp\}]) \quad (7B)$$

The resulting signal is then amplified by amplifier 438B. In one embodiment, the gain of amplifier 438B is one, and thus the output signal from the gain temperature compensation circuit remains the same as for Formula 7B.

Examining the resulting signal formula of Formula 7B, the offset of the electric sensor output signal is compensated for non-linearly since OTC +f(Temp) is a function of temperature. Furthermore, since GTC is constant, the gain of the electrical sensor output signal is compensated for linearly.

FIG. 4C illustrates a sensor temperature compensation circuit 400C in which both of the offset and gain temperature compensations are non-linear. The offset temperature compensation circuit 420C includes elements 421C through 427C. The gain temperature compensation circuit 430C includes elements 431C through 438C.

The structure and function of the offset compensation circuit 420C of FIG. 4C may be the same as that described for FIG. 4B. Accordingly, the signal generated by the summer 422C is described adequately by Formula 2B above, which is reproduced below for convenience as the following Formula 1C:

$$Vin+Offset+(OTC+f(Temp))*Temp \quad (1C)$$

Once again, from observation of Formula 1C, it can be seen that the temperature compensation for offset may be performed non-linearly by choosing an appropriate value for OTC and an appropriate temperature function f(Temp). The function f(Temp) may be selected using temperature function parameters provided to the Temp function DAC 425C, and may be different than the temperature functions of FIGS. 4A and 4B.

The electrical sensor output signal from the offset temperature compensation circuit 420C of FIG. 4C is then provided to the gain temperature compensation circuit 430C of FIG. 4C. Specifically, the electrical sensor output signal is first provided to a variable gain amplifier 433C, which amplifies the signal with a gain Gain. The amplified signal coming from the variable gain amplifier 433C will thus have a value defined by the following Formula 2C:

(Vin+Offset+[OTC+f(Temp)]*Temp)*Gain    (2C)

This signal will also be referred to herein as the "variable gain amplifier output signal of FIG. 4C".

The variable gain amplifier output signal of FIG. 4C is provided to an amplifier 431C having a gain referred to herein as "$K_G$". Accordingly, the amplifier 431C generates an output signal represented by the following Formula 3C:

(Vin+Offset+[OTC+f(Temp)]*Temp)*(Gain*$K_G$)    (3C)

The variable gain amplifier output signal of FIG. 4C is also provided to a GTC DAC 434C, which multiples the variable gain amplifier output signal of FIG. 4C with a gain of a Gain Temperature Coefficient (GTC) to obtain a signal represented by the following Formula 4C:

(Vin+Offset+[OTC+f(Temp)]*Temp)*(Gain*GTC)    (4C)

This signal is an example of a first gain compensation signal of FIG. 3B.

Finally, the variable gain amplifier output signal of FIG. 4C is provided to a Temp function DAC 435C, which multiples the variable gain amplifier output signal of FIG. 4C with a gain that is a function of temperature f(Temp), which may be different than the temperature function of FIGS. 4A and 4B, and different than the temperature function used in the offset compensation portion of the circuit 400C of FIG. 4C. The resulting signal is represented by the following Formula 5C:

(Vin+Offset+[OTC+f(Temp)]*Temp)*(Gain*f(Temp))    (5C)

This signal is an example of a second gain compensation value for FIG. 4C. In this example, the signal is a function of f(Temp). While the function f(Temp) might be any function of temperature, the function may be carefully selected using f(Temp) parameter(s) that provide for suitable non-linear gain temperature compensation.

The signals from Equations Formulae 4C and 5C are then received by summer 436C to generate a summed signal represented by the following Formula 6C:

(Vin+Offset+[OTC+f(Temp)]*Temp)*(Gain*[GTC+f(Temp)])    (6C)

This signal is provided to a temperature DAC 437C where they are multiplied by the measured temperature Temp to obtain the following Formula 7C:

(Vin+Offset+[OTC+f(Temp)]*Temp)*(Gain*[GTC+f(Temp)]*Temp)    (7C)

The temperature DAC 437C represents a suitable example of the temperature function multiplication component 315B of FIG. 3B.

The summer 432C then adds the signal from Formulae 3C and 7C to obtain the following Formula 8C:

(Vin+Offset+[OTC+f(Temp)]*Temp)*(Gain*[$K_G$+ {GTC+f(Temp)}* Temp])    (8C)

The resulting signal is then amplified by amplifier 438C. In one embodiment, the gain of amplifier 438C is one, and thus the output signal from the gain temperature compensation circuit remains the same as for Formula 8C.

Examining the resulting signal equation formula of Formula 8C, both the offset and gain of the electric sensor output signal are compensated for non-linearly since OTC+f(Temp) and GTC+f(Temp) both vary with temperature.

Figure 5A:
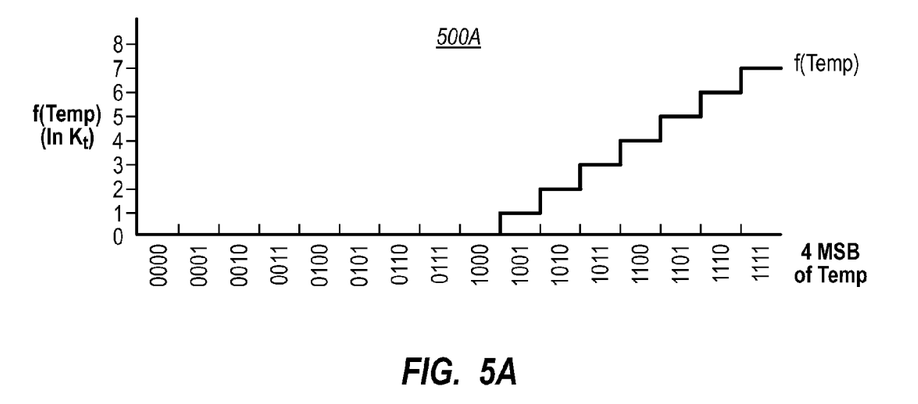
FIG. 5A illustrates one example of a temperature function that may be used as a multiplier to obtain non-linear temperature compensation in which the multiplier is relatively constant if a measured temperature is below a reference temperature, and is a stepped function if the measured temperature is above the reference temperature.
Figure 5B:
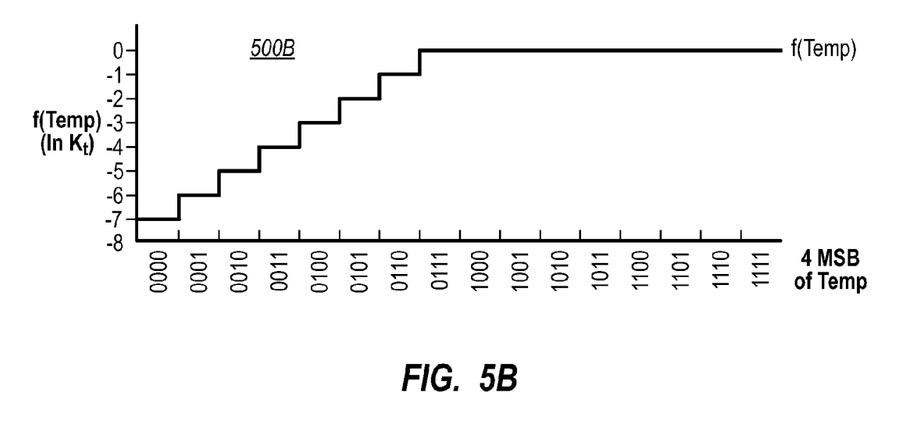
FIG. 5B illustrates one example of a temperature function that may be used as a multiplier to obtain non-linear temperature compensation in which the multiplier is relatively constant if a measured temperature is above a reference temperature, and is a stepped function if the measured temperature is below the reference temperature.

FIGS. 5A and 5B illustrates example selections for f(Temp) in which when the measured temperature is on one side of a reference temperature, the f(Temp) function also has a constant value which is, in the illustrated cases, zero. On the other hand, when the measured temperature is on the other side of the reference temperature, the f(Temp) signal becomes stepped with temperature. FIGS. 5A and 5B will now be described in further detail as examples of this more specific principle.

In the example of FIG. 5A, when the measured temperature is below the reference temperature (e.g., when the most significant bit of the measured temperature is zero), the multiplier contributed by f(Temp) is zero. On the other hand, when the measured temperature is above the reference temperature, the temperature function f(Temp) is stepped. In the illustrated example of FIG. 5A, the f(Temp) value is proportional to the second through fourth most significant bits.

Accordingly, the f(Temp) signal is indeed a function of temperature, even through for some measured temperature ranges, the f(Temp) signal has a constant value. In one embodiment, the measured temperature value Temp is a 10 bit integer value ranging from 0 to 1023. The f(Temp) signal shown in FIG. 5A may be expressed by the following Equations 1D and 2D:

$$\text{if Temp} < 512, f(\text{Temp}) = 0 \quad (1D)$$

$$\text{if Temp} >= 512, f(\text{Temp}) = int\left(\frac{\text{Temp} - 512}{64}\right) * K_t \quad (2D)$$

In Equation 2D, the value $K_t$ may be a constant thus resulting in the constant step sizes in FIG. 5A. The value $K_t$ may be selected to maximize non-linear temperature compensation given the characteristics of the sensor temperature dependencies. In one embodiment, the value $K_t$ may be varied as a function of temperature, to thereby provide even further flexibility in maximizing non-linear temperature compensation. The width of each of the step sizes are each 64 values wide, although that width may also be adjusted to fine-tune the non-linear temperature compensation. For instance, all measured temperature Temp values from binary 1011000000 to 1011111111 will result in an f(Temp) value of 3×$K_t$ according to FIG. 5A.

In the example of FIG. 5B, when the measured temperature is above the reference temperature (e.g., when the most significant bit of the measured temperature is one), the multiplier contributed by f(Temp) is zero. On the other hand, when the measured temperature is below the reference temperature, the temperature function f(Temp) is stepped. In the illustrated example of FIG. 5B, the negative f(Temp) value is proportional to the bit-wise inverted value of the second through fourth most significant bits of Temp.

Therefore, the principles of the present invention allow for the flexible configuration of non-linear temperature compensation for offset and gain. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims are to be embraced within their scope.

What is claimed is:

1. A sensor temperature compensation circuit comprising:
a sensor that is structured such that when the sensor is operating, the sensor senses a physical parameter and generates an electrical sensor output signal representing the physical parameter;
an offset temperature compensation circuit that receives the electrical sensor output signal directly from the sensor, and is a non-linear offset temperature compensation circuit comprising:
 a first amplifier that receives the electrical sensor output signal and generates an amplified electrical sensor output signal;
 a first summer that receives the amplified electrical sensor output signal as a first input, a second input from an offset digital-to-analog converter (DAC), and a third input from a first temperature DAC and sums the first, second, and third inputs to generate a non-linear offset temperature compensation circuit output that is provided to a non-linear gain temperature compensation circuit;
 the offset DAC that generates the second input to the first summer by multiplying a voltage offset and a reference value of the sensor;
 the first temperature DAC that generates the third input to the first summer by multiplying a summed signal received from a second summer with the sensor temperature, the third input to the first summer for performing linear sensor temperature compensation on an offset characteristic of the electrical sensor output signal;
 the second summer that receives a first input from an OTC DAC and a second input from a first temperature function DAC and sums the first and second inputs to generate the summed signal that is provided to the first temperature DAC;
 the OTC DAC that generates the first input to the second summer by multiplying an offset temperature coefficient (OTC) with the reference value of the sensor; and
 the first temperature function DAC that generates the second input to the second summer by multiplying an offset parameter that is a function of the sensor temperature with the reference value of the sensor, the generated second input to the second summer for performing non-linear sensor temperature compensation on an offset characteristic of the electrical sensor output signal; and
a non-linear gain temperature compensation circuit comprising:
 a variable gain amplifier that amplifies the non-linear offset temperature compensation circuit output to generate a variable gain amplifier output signal;
 a third amplifier, a GTC DAC, and a second temperature function DAC, wherein each of the third amplifier, the GTC DAC, and the second temp function DAC receive the variable gain amplifier output signal,
 wherein the third amplifier amplifies the variable gain amplifier output signal to generate a first input to a third summer;
 wherein the GTC DAC multiplies the variable gain amplifier output signal with a gain temperature coefficient (GTC) to generate a first input to a fourth summer, the first input for performing linear sensor temperature compensation on a gain characteristic of the electrical sensor output signal; and
 wherein the second temperature function DAC multiples the variable gain amplifier output signal with a gain parameter that is a function of the sensor temperature to generate a second input to the fourth summer, the second input for performing non-linear sensor temperature compensation on a gain characteristic of the electrical sensor output signal;
 the fourth summer that receives the first and second inputs to the fourth summer and generates a summed signal as an input to a second temperature DAC;
 the fourth temperature DAC that multiplies the summed signal with the sensor temperature to generate a second input to the third summer; and
 the third summer that sums the first and second inputs to the third summer to generate the output of the non-linear gain temperature compensation circuit.

2. A sensor temperature compensation circuit in accordance with claim 1, wherein the gain parameter that is a function of the sensor temperature is a constant multiplier if the sensor temperature is on a first side of a reference temperature, and is a stepped multiplier if the sensor temperature is on a second side of the reference temperature.

3. A sensor temperature compensation circuit in accordance with claim 2, wherein the sensor temperature is a digital temperature value representation of the current temperature of the sensor, and wherein at least the most significant bit of the digital temperature value is used to identify which side of the reference temperature the sensor temperature is.

4. A sensor temperature compensation circuit in accordance with claim 3, wherein one or more of the other bits of the digital temperature value are used to define step boundaries of the stepped multiplier if the sensor temperature is on the second side of the reference temperature.

5. A sensor temperature compensation circuit in accordance with claim 2, wherein the first side of the reference temperature is below the reference temperature, and the second side of the reference temperature is above the reference temperature.

6. A sensor temperature compensation circuit in accordance with claim 2, wherein the first side of the reference temperature is above the reference temperature, and the second side of the reference temperature is below the reference temperature.

7. A sensor temperature compensation circuit in accordance with claim 1, wherein the non-linear gain compensation circuit further comprises:
a fourth amplifier that amplifies the output of the third summer.

8. A sensor temperature compensation circuit in accordance with claim 1, wherein the offset parameter that is a function of the sensor temperature is a constant multiplier if the sensor temperature is on a first side of a reference temperature, and is a stepped multiplier if the sensor temperature is on a second side of the reference temperature.

9. A sensor temperature compensation circuit in accordance with claim 8, wherein the sensor temperature is a digital temperature value representation of the current temperature of the sensor, and wherein at least the most significant bit of the digital temperature value is used to identify which side of the reference temperature the sensor temperature is.

10. A sensor temperature compensation circuit in accordance with claim 9, wherein one or more of the other bits of the digital temperature value are used to define step boundaries of the stepped multiplier if the sensor temperature is on the second side of the reference temperature.

11. A sensor temperature compensation circuit in accordance with claim 8, wherein the first side of the reference temperature is below the reference temperature, and the second side of the reference temperature is above the reference temperature.

* * * * *